Patented Jan. 19, 1926.

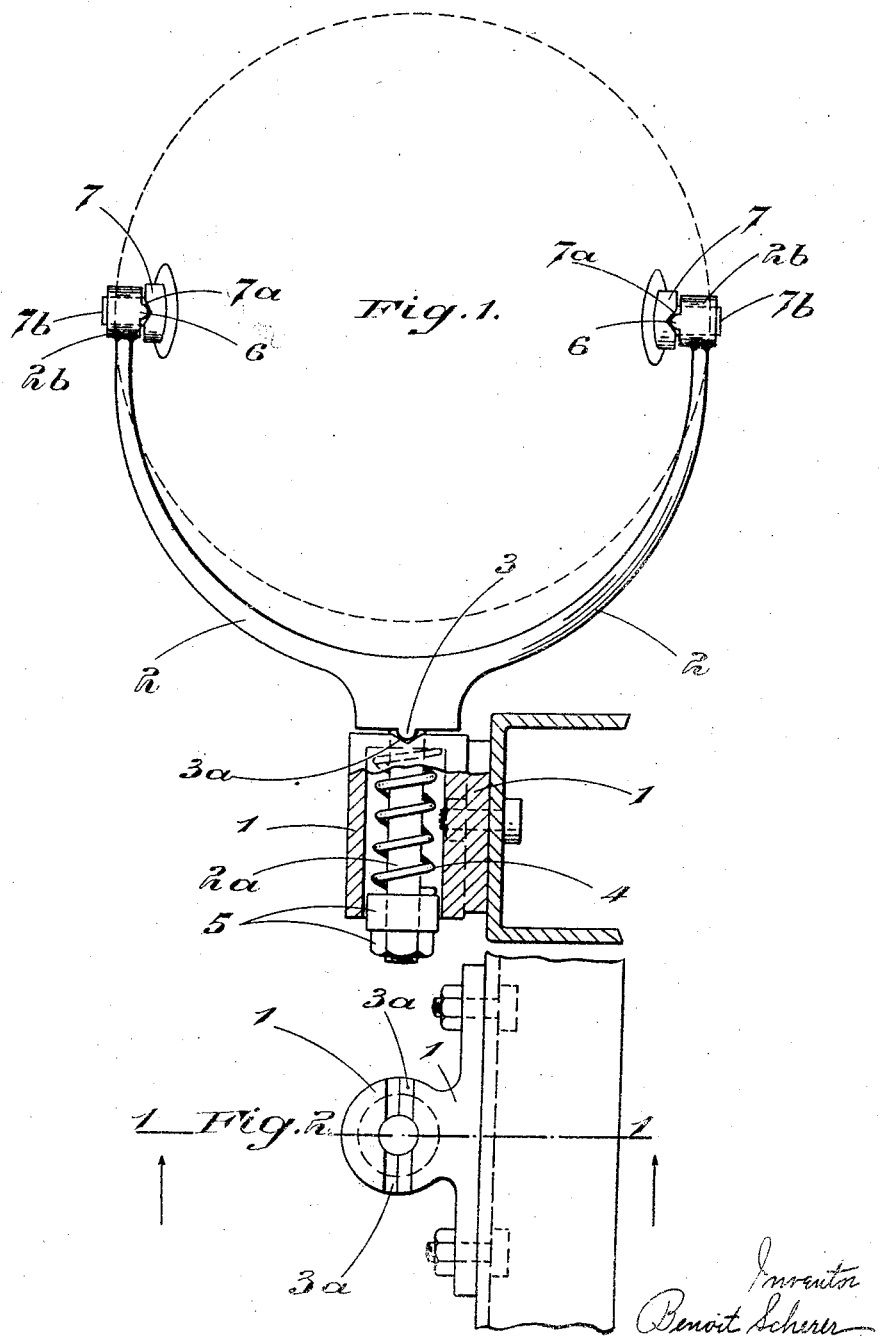

1,570,284

UNITED STATES PATENT OFFICE.

BENOIT SCHERER, OF COURBEVOIE, FRANCE.

ORIENTABLE HEADLIGHT FOR AUTOMOBILES.

Application filed September 8, 1924. Serial No. 736,613.

*To all whom it may concern:*

Be it known that I, BENOIT SCHERER, a citizen of the Republic of Switzerland, manufacturer, of 28 Rue de Chartres, Courbevoie, France, have invented new and useful Improvements to Orientable Headlights for Automobiles, of which the following is a specification.

Orientable projectors used on automobiles are habitually mounted in a fork which turns in a suitable support. This kind of mounting is satisfactory for directing the beam of light by hand, but as soon as it is released the vibrations cause the projector to pivot without delay about its axis. It is therefore impossible to use the projector for illuminating the road during the operation of the vehicle without constantly holding it or else having previously screwed the locking nuts up tightly.

The projector support which is the object of the present invention does away with this disadvantage by permitting the projector to be automatically locked in a given direction.

For demonstrative purposes the accompanying drawing represents a projector support designed according to the invention, the support being made in the form of a fork and mounted so that it may be oriented in a socket in which it may also be held immovable. The outside perimeter of the projector is indicated by a dotted line.

Figure 1 is an elevation of the projector holder mounted in a socket, the latter being shown in vertical section.

Figure 2 is a plan of the said socket, looking down from above.

In the figures:

1 indicates the socket for vertical pivoting motion, in part section.

2 indicates the fork support for the projector.

3 indicates a boss or tooth provided on the base of the said fork.

$3^a$ indicates a notch cut in the top of the socket.

4 indicates a helical spring.

5 indicates a nut for holding and tightening the said spring.

6 indicates bosses or teeth provided on the inside of the ends of the fork, 7 indicates horizontal arms with pivots $7^b$ each having a notch $7^a$ and attached to the projector on each side for supporting it.

The apparatus thus defined and designed operates in the following manner:

The pivot $2^a$ lengthening the stem of the fork 2 passes through the socket-bearing 1 which is hollow; a helical spring 4 is wrapped around the said pivot and held against the inside of the upper end of the socket by the pressure of the nut 5 screwed on the end of the said pivot.

The fork 2 is thus held down on to the upper end of the socket 1, this end having a diametrical cut or notch $3^a$ with sloping sides. In the position shown in the drawing (Figure 1), the bosses or teeth 3 provided on the base of the fork 2, is engaged in the said notch $3^a$ and holds the fork immovable. If it is desired to rotate the projector mounted on the fork, one has only to exert a slight turning effort on the projector or on the fork, for example by means of a handle (not shown) provided on the projector. The boss 3 will then slide on the sloping side of the notch $3^a$ and the fork 2 will be raised, compressing the spring 4. When the said boss moves onto the flat part of the end of the socket it will enable the rotation of the fork to be continued under the restistance of a slight friction.

The effect is obtained by an analogous but slightly different device for rocking the projector about a horizontal axis in the fork 2. The projector is supported so that it can oscillate in the bearings $2^a$ provided on the jaws of the fork, by means of the pivots $7^b$ which form extensions of the arms 7. The said fork has bosses or teeth 6 opposite the arms 7. These bosses engage in the notches $7^a$ which are cut diametrically at the ends of the arms 7.

The action of the helical spring 4 (shown in Figure 2) is here replaced by the elasticity of the two jaws of the fork 2. For this purpose it is only necessary to design the fork so that the distance between the jaws is slightly less than that between the ends of the two arms 7 on the projector.

The rotation of the fork in the socket 1 and the pivoting of the projector between the jaws of the said fork may be remote controlled by any suitable device.

When the bosses or teeth 3 and 5 are brought back into the corresponding notches $3^a$ and $7^a$, by the action of the said device by a return spring, the fork and the projector will be held immovable in the normal position.

What I claim is:

A headlight casing having oppositely extending pivot arms and also having diametrically enlarged bases at the inner ends of said pivot arms each provided with a V-shaped notch, in combination with a supporting fork having spring arms each provided with a bearing for one of the pivot arms and also provided with a tooth for engagement with said notch, said fork also having a vertical pivot stem at its base and being further provided at one side of the upper end of said stem with a tooth, and a supporting socket for said fork having a bore of greater diameter than and through which said stem extends, said socket having a V-shaped notch for engagement by the last named tooth and a spring on said stem and normally holding said tooth in engagement with said notch.

In witness whereof I affix my signature.

BENOIT SCHERER.